Sept. 5, 1950        M. KILPATRICK        2,521,121

DISPERSION SEPARATION

Filed Sept. 29, 1943        2 Sheets-Sheet 1

Martin Kilpatrick
INVENTOR

BY-

ATTORNEY

Martin Kilpatrick
INVENTOR

Patented Sept. 5, 1950

2,521,121

UNITED STATES PATENT OFFICE 2,521,121

DISPERSION SEPARATION

Martin Kilpatrick, Philadelphia, Pa., assignor to the United States of America as represented by the United States Atomic Energy Commission Application September 29, 1943, Serial No. 504,270

3 Claims. (Cl. 210—8.5)

This invention relates to the separation of the phases of a dispersion, and more particularly it relates to the separation of such phases by means of a porous member.

The term "dispersion" as used throughout the specification and claims, is to be understood as including emulsions and immiscible liquids which can be maintained in a disperse phase by constant agitation, and the like.

Heretofore, the separation of the phases of a dispersion has involved the use of gravity or centrifugal force. Many systems bordering on permanent emulsions separate very slowly by gravity, and it is necessary to use centrifugal force, which means the use of more or less elaborate, expensive centrifuges.

It is an object of this invention to provide an improved method and apparatus which is capable of satisfactorily separating the phases of a dispersion.

It is another object of this invention to provide a method and apparatus which is capable of satisfactorily separating the phases of a dispersion that are difficult to separate by previously known methods and apparatus.

It is still another object of this invention to provide a method and apparatus which is capable of quantitatively separating the phases of a dispersion.

Other objects of the invention will appear hereinafter.

The above objects may be accomplished, in accordance with the present invention, by forcing a dispersion, while agitating the same, against a porous member with sufficient pressure to force at least one of the phases of the dispersion through said porous member. It has now been found that many emulsions and dispersions, which previously were separated from each other with difficulty, can be readily separated with substantially 100% separation. Although the present invention may be used for the separation of the phases of dispersions in general, it is particularly useful in the rapid separation of immiscible liquids that are first agitated to a state of turbulence to form a temporary dispersion of one phase in the other.

The present invention will be more readily understood by reference to the following detailed description when taken in connection with the accompanying drawings, in which.

Figure 1:
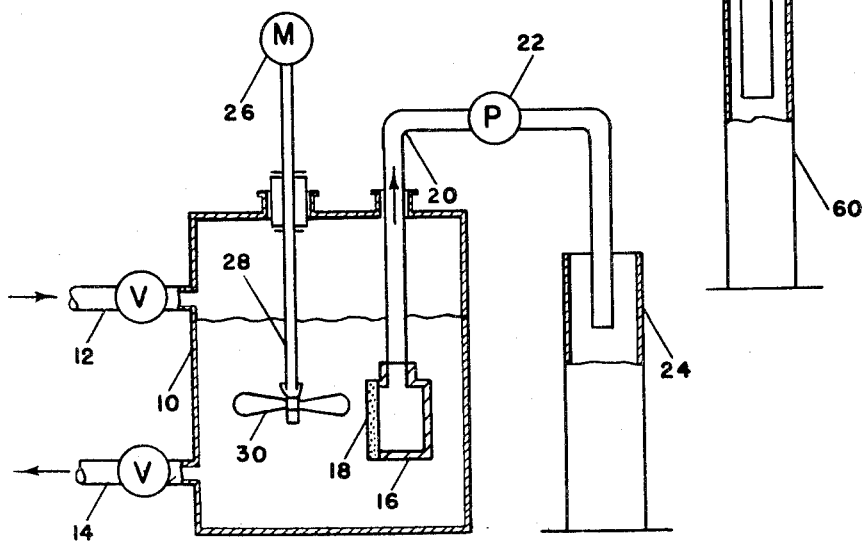
Fig. 1 is a diagrammatic, side elevational view of one form of apparatus suitable for carrying out the present invention.

Referring to Fig. 1 of the drawings, reference numeral 10 designates a container for a dispersion which may, if desired, be continuously circulated through the container by means of valved inlet 12 and valved outlet 14. A small container 16 is positioned within the body of the dispersion, one wall, 18, of container 16 being comprised of a porous member or membrane such as, for example, porous porcelain, porous fritted glass, a metal alloy treated with a material to at least partially dissolve one of the alloy components sufficiently to make the member porous, or a similar material. The container 16 is provided with an outlet conduit 20 containing a suction pump 22. A receptacle 24 for the liquid passing from the container 16 is provided below the outlet of the conduit 20. An electric motor 26, or the like, is positioned above the container 10 and is adapted to drive a motor shaft 28 which is provided with a stirring propeller 30 adjacent the porous member 18. The stirring propeller should be of sufficient size, and be driven at sufficient speed to create a turbulent flow of the dispersion adjacent the charge side of the porous member 18. The suction pump 22 must be driven at such a speed as to create a sufficient lowering of pressure at the discharge side of the porous member 18 to induce a flow of one of the phases through the member.

Figure 2:
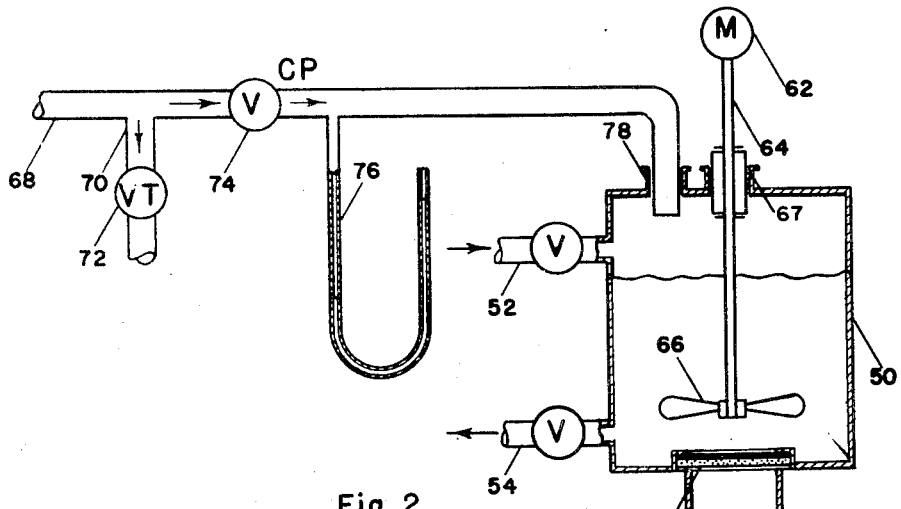
Fig. 2 is a similar diagrammatic, side elevational view of another embodiment of the invention.

Referring to Fig. 2 of the drawings, a dispersion receptacle 50 is provided with a valved inlet 52 and a valved outlet 54. At the bottom of the container 50 is positioned a porous member 56, and fastened to the bottom of the container 50, concentric with the porous member 56, is a funnel-shaped element 58. A receptacle 60 is positioned below funnel 58. A motor 62 is positioned above receptacle 50 and is adapted to drive shaft 64 and propeller 66. The motor shaft is provided with a suitable journal bearing and stuffing box 67 at the point where it enters receptacle 50, so that a dispersion within receptacle 50 can be maintained substantially air-tight. The propeller 66 is positioned closely adjacent to porous member 56 so that rotation thereof by motor 62 will cause the dispersion to move across the surface of the charge side of the porous member 56 with a turbulent flow.

A compressed air conduit 68 is connected at the point 78 to the receptacle 50. The compressed air conduit is provided with a branch conduit 70 and throttle valve 72 whereby to permit of bleeding a portion of the compressed air from conduit 68. Conduit 68 is also provided with a constant pressure outlet valve 74. This constant pressure outlet valve may comprise a conventional pressure regulator or similar device to permit the passing of air at a constant pressure into the receptacle 50. Conduit 68 is also provided with a manometer 76 whereby the pressure in the conduit 68 can be constantly measured.

The device shown in Fig. 2 operates in substantially the same manner as the device shown in Fig. 1 except that the dispersion is subjected to pressure whereby to create a pressure differential on opposite sides of the porous member, whereas the apparatus of Fig. 1 depends upon a suction to create the necessary pressure differential. In any apparatus to be used in accordance with this invention, it is essential that the porous member be completely submersed in the dispersion throughout the separation procedure.

Figure 3:
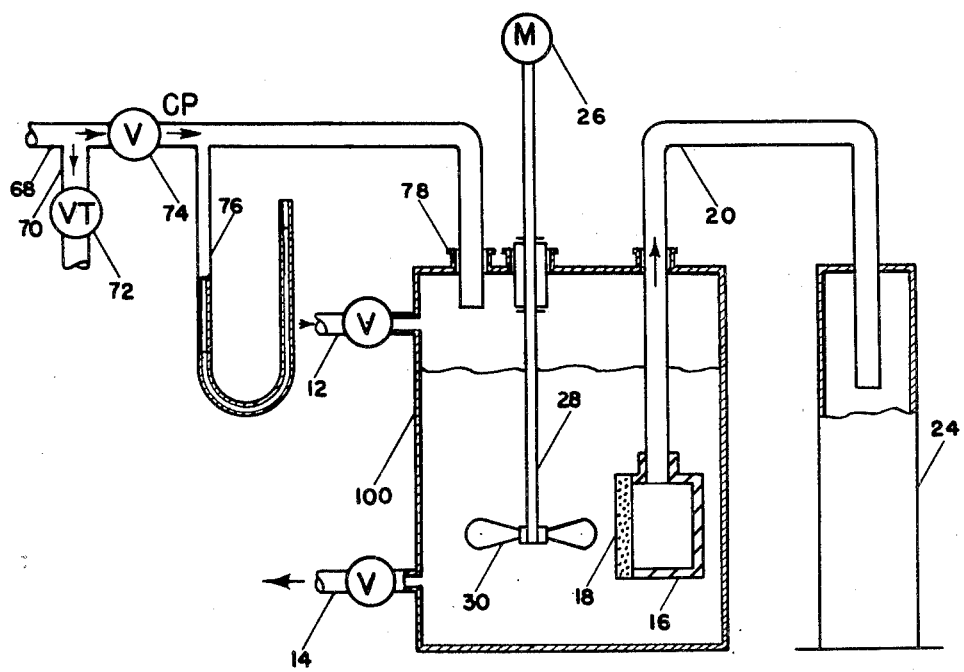
Fig. 3 is another diagrammatic side elevational view of still another embodiment of the invention.

Fig. 3 of the drawing illustrates a device similar in construction to the device of Fig. 1 but containing a pressure imparting mechanism such as shown in Fig. 2. In Fig. 3, the suction pump 22, shown in Fig. 1 has been omitted since it is unnecessary. The dispersion container 100 is enclosed in an air-tight manner similar to container 50 of Fig. 2, and an air pressure system identical to that shown in Fig. 2, and designated by reference characters 68, 70, 72, 74, 76, is connected to the top of container 100 at the point 78.

In this device the air pressure in conduit 68 creates the pressure differential on opposite sides of porous member 18 to force one of the phases of the dispersion therethrough.

It is essential, in accordance with this invention, that the dispersion be agitated with sufficient force to create a turbulent flow and prevent stratification of the dispersion in contact with the charge side of the porous member. By "turbulent flow" is meant a flow in which there is a complete disorder and mixing of the phases of the dispersion.

It is also essential that the pressure on the charge side of the porous member be sufficiently higher than that on the discharge side so that a flow of one of the phases will pass therethrough. The amount of material forced through a porous member will depend, partially, upon the magnitude of the pressure differential between the charge and discharge sides of the porous member. The amount of material forced through a given porous member will also depend, of course, upon the particular dispersion being separated.

In some cases, it is desirable to obtain, as nearly as possible, 100% separation of the dispersion phases. If 100% separation is desired with a porous member having a given pore size, then in that case, of course, it will be necessary to use a considerably lower pressure than in the case where a lower degree of separation, for example, 80%-90% separation, is acceptable.

The permissible pressure differential is also dependent upon the pore size of the pores in the porous member, and it is also dependent to some extent upon the nature of the porous member. Under a given set of operating conditions the optimum pore sizes in a porous member constructed of fritted glass will be different than the optimum pore sizes in a porous member constructed of a metal. For most purposes, it is greatly preferred that the porous member have pores between 10 and 200 microns in diameter. With members having pore sizes as above specified, it is preferred that the pressure differential between opposite sides of the porous member be between 0.1 and 25 lbs. per sq. in. The actual pressure differential used in any specific instance will be dependent upon the viscosity characteristics of the components of the dispersion and the size of the pores in the porous member used. It has been found that the use of a porous member with small pores and a high pressure differential generally gives a more efficient separation than the use of a porous member having large pores and a low pressure differential.

The following examples, the details of which are not to be considered as limiting the scope of the present invention, are illustrative of certain preferred methods of carrying out the present invention.

EXAMPLE I

Using an apparatus of the type generally illustrated in Fig. 2 of the drawings, with a porous member of fritted glass having pores between 35 and 85 microns in diameter, and placing into the container 50, approximately 660 cc. of water and 565 cc. of ether, 100% separation of the materials was obtained by agitating the mass until a fine dispersion was obtained and then applying the pressure as set forth in the table below. The results will appear from the table.

*Table I*

| Pressure, cm. Hg | Material Passed Through Porous Member (cc.) | | Percent $H_2O$ in Material Passed | Rate of Separation | |
|---|---|---|---|---|---|
| | Water | Ether | | Secs. per 10 cc. | Cc. per min. |
| 8.7 | 40 | 0 | 100 | 128.3 | 4.66 |
| 16.9 | 35 | 0 | 100 | 110.0 | 5.45 |
| 22.2 | 35 | 0 | 100 | 80.0 | 7.50 |
| 29.8 | 30 | 0 | 100 | 60.0 | 10.0 |
| 32.4 | 30 | 0 | 100 | 82.0 | 7.32 |

EXAMPLE II

Using an apparatus of the type generally illustrated in Fig. 2 of the drawings, with a porous member of fritted glass having pores between 10 and 35 microns in diameter, substantially 100% separation was obtained from a mixture comprising equal parts by volume of heptane and aniline in accordance with the table given below.

*Table II*

| Pressure, cm., Hg | Material Passed Through Porous Member | | Percent Aniline in Material Passed | Rate of Separation | | |
|---|---|---|---|---|---|---|
| | Aniline, cc. | Heptane, cc. | | Secs. Time | Cc. | Cc. per min. |
| 11.0 | 5 | 0 | 100 | 277 | 3 | 0.65 |
| 14.6 | 5 | 0 | 100 | 270 | 4 | 0.89 |
| 22.5 | 10 | 0 | 100 | 224 | 5 | 1.33 |
| 28.8 | 10 | 0 | 100 | 155 | 5 | 1.93 |
| 38.5 | 10 | 0 | 100 | 126 | 5 | 2.38 |
| 47.0 | 40 | 0 | 100 | 1,117 | 25 | 1.34 |

EXAMPLE III

Using an apparatus of the type generally illustrated in Fig. 2 of the drawings, with a porous member of fritted glass having pores between 10 and 35 microns in diameter, substantially 100% separation was obtained from a mixture comprising equal parts by volume of furfural and heptane in accordance with the following table.

*Table III*

| Pressure, cm., Hg | Material Passed Through Porous Member | | Time, Secs. | Rate of Separation, cc. | cc. per min. |
|---|---|---|---|---|---|
| | Furfural, cc. | Heptane, cc. | | | |
| 2.4 | 5 | 0 | 30.0 | 1 | 2 |
| 2.6 | 40 | 0 | 62.6 | 5 | 4.8 |
| 2.7 | 20 | 0 | 45.2 | 5 | 6.7 |
| 2.8 | 20 | 0 | 39.6 | 5 | 7.6 |
| 2.9 | 10 | 0 | 35.0 | 5 | 8.6 |
| 3.0 | 10 | 0 | 32.6 | 5 | 9.2 |
| 3.2 | 10 | 0 | 38.4 | 7 | 10.9 |
| 3.4 | 15 | 0 | 34.0 | 6 | 10.6 |
| 3.7 | 10 | 0 | 25.0 | 5 | 12.0 |
| 3.9 | 15 | 0 | 47.8 | 10 | 12.5 |
| 4.1 | 15 | 0 | 48.0 | 10 | 12.5 |
| 4.3 | 15 | 0 | 48.0 | 10 | 12.5 |
| 4.7 | 15 | 0 | 48.5 | 10 | 12.3 |

The phases of the following dispersions have been successfully separated in accordance with the principles of the present invention.

1. Ethyl ether—water
2. Ethyl ether—water, with a commercial wetting agent
3. Ethyl ether—water, with a dissolved inorganic salt
4. Isopropyl ether—water
5. Isobutyl alcohol—water
6. p-Cymene—water
7. Nitro benzene—water
8. Ethyl acetate—water
9. Ethyl acetate—water, with a dissolved inorganic salt
10. Lubricating oil—water
11. n-Heptane—water
12. Furfural—n-heptane
13. Methyl cyclohexane—n-heptane—aniline
14. Ethyl ether—water—acetic acid In all of the above dispersions involving water, Nos. 1–11 and 14, the aqueous phase passed through the porous member. This was the case no matter whether the aqueous phase was lighter and less viscous or heavier and more viscous than the other phase. In dispersion, No. 12, furfural passed through the porous member and in dispersion No. 13, the aniline passed through the porous member.

Although I do not wish to be limited by any theory of operation, it is believed that the process of the present invention operates on a principle of preferential wetting of the porous member by one of the phases of a dispersion. The phase which has the maximum wetting action on the porous member will be the phase to pass through the porous member, and thereby exclude, or restrain, the passage therethrough of the phase, or phases, having a lesser wetting action on said member.

Since it is obvious that many changes and modifications can be made in the details of the above described process and apparatus, it is to be understood that the invention is not to be limited to these details except as set forth in the appended claims.

I claim:

1. A method of separating a dispersion of immiscible liquids into phases that consists in agitating the dispersion to a state of turbulence wherein the phases of the dispersion are thoroughly mixed, continuously maintaining the dispersion in turbulence while passing it across a porous member completely submersed therein, and maintaining a predetermined difference in pressure across the porous member, whereby one of the phases is induced to flow therethrough, thereby retarding at least in part the passage of other phases.

2. A method of separating a dispersion of immiscible liquids into phases that comprises agitating the dispersion to a state of turbulence wherein the phases are thoroughly mixed, continuously maintaining the dispersion in turbulence while passing it across the charge side of a porous member completely submersed therein, and maintaining a predetermined higher pressure on the charge side of said member than on the discharge side thereof whereby one of the phases is induced to flow therethrough, thereby retarding at least in part the passage of other phases through the porous member.

3. A method of separating a dispersion of immiscible liquids into phases that includes introducing the dispersion into a substantially air tight receptacle, agitating the dispersion to a state of turbulence wherein the phases of the dispersion are thoroughly mixed, introducing a compressed fluid into the receptacle to maintain a predetermined pressure on the dispersion therein, passing the dispersion, while maintaining it in turbulence, across a porous member completely submersed therein, and maintaining a predetermined difference in pressure across the porous member whereby one of the phases is induced to flow therethrough, thereby retarding at least in part the passage of other phases through the porous member.

MARTIN KILPATRICK.

REFERENCES CITED

The following references are of record in the file of this patent:

UNITED STATES PATENTS

| Number | Name | Date |
|---|---|---|
| 898,415 | Merralls | Sept. 8, 1908 |
| 994,377 | Cottrell | June 6, 1911 |
| 1,043,455 | Neil | Nov. 5, 1912 |
| 1,081,030 | Entorf | Dec. 9, 1913 |
| 1,304,124 | Trumble | May 20, 1919 |
| 1,331,732 | Wait | Feb. 24, 1920 |
| 1,530,087 | MacArthur | Mar. 17, 1925 |
| 1,584,743 | Hensley | May 18, 1926 |
| 1,665,164 | Gard et al. | Apr. 3, 1928 |
| 1,725,925 | Kent | Aug. 27, 1929 |
| 1,873,597 | Jones | Aug. 23, 1932 |
| 1,947,709 | Garrison et al. | Feb. 20, 1934 |
| 1,974,235 | Cammen | Sept. 18, 1934 |
| 2,089,702 | Lomax | Aug. 10, 1937 |
| 2,271,662 | Rubissow | Feb. 3, 1942 |
| 2,306,986 | Tolman | Dec. 29, 1942 |
| 2,332,965 | Ducommun et al. | Oct. 26, 1943 |
| 2,359,386 | Reinsch | Oct. 3, 1944 |